United States Patent Office 3,262,911
Patented July 26, 1966

3,262,911
SUBSTITUTED POLYPHENYLENE ETHERS
Allan S. Hay, Schenectady, N.Y., assignor to General Electric Company, a corporation of New York
No Drawing. Filed Nov. 29, 1961, Ser. No. 155,827
15 Claims. (Cl. 260—47)

This invention relates to the preparation of halomethyl-substituted polyphenylene ethers, and to the method of their preparation. More particularly, this invention relates to polyphenylene ethers having halomethyl substituents on the phenylene nucleus in either the 2- or 2,6-positions, and to their method of preparation.

In my copending application, Serial No. 212,128, filed July 24, 1962, and assigned to the same assignee as the present invention, which is a continuation-in-part of my applications Serial No. 69,245, filed November 15, 1960, and Serial No. 744,086, filed June 24, 1958, both of which are now abandoned, I have disclosed and claimed polyphenylene ethers having the repeating structural unit represented by the formula:

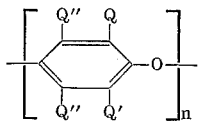

wherein the oxygen atom of one unit is connected to the phenylene nucleus of the adjoining unit, $n$ is a positive integer and is at least 10 and preferably at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q' and Q'' are both monovalent substituents which are the same as Q and in addition, halogen, arylhydrocarbon radicals, haloarylhydrocarbon radicals, hydrocarbonoxy radicals free of an aliphatic, tertiary α-carbon atom, and halohydrocarbonoxy radicals having at least two carbon atoms and being free of an aliphatic, tertiary α-carbon atom. The method comprises reacting oxygen in the presence of a tertiary amine and a cuprous salt soluble in the tertiary amine and capable of existing in the cupric state with a phenol having the structural formula

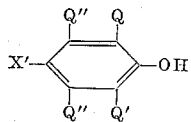

where X' is hydrogen, chlorine, bromine or iodine and Q, Q' and Q'' are the same as defined above. Other specific mixed polyphenylene ethers of this same general type which are useful in the practice of this invention are disclosed and claimed in a copending application of Jack Kwiatek, Serial No. 744,087, filed June 24, 1958, and assigned to the same assignee as the present invention. Because halomethyl groups are so hydrolytically reactive, they produce undesirable products in the above oxidation reaction if they are substituents on the phenol and are, therefore, excluded from the claims of the above-identified copending applications.

I have now discovered a general, rapid, facile and inexpensive method of preparing polyphenylene ethers having halomethyl groups in the 2- or 2,6-positions which comprises reacting a brominating or chlorinating agent with the corresponding methyl-substituted polyphenylene ethers, whereby bromine or chlorine readily substitutes in the methyl group to produce the corresponding mono-, di- or tribromomethyl or mono-, di- or trichloromethyl groups. The corresponding fluoro and iodo-substituted methyl-substituted polyphenylene ethers cannot be prepared in this manner but can be prepared by reacting the corresponding chlorine or bromine compound with a metallic fluoride, for example, antimony trifluoride, antimony pentafluoride, or mercuric fluoride, or a metallic iodide such as potassium iodide, by procedures well known to the art.

The compositions of this invention have the repeating structural unit represented by the formula:

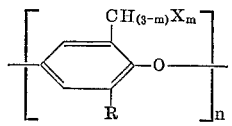

wherein the oxygen atom of one unit is connected to the phenylene nucleus of the adjoining unit, $n$ is a positive integer and is at least 10 and preferably at least 100, $m$ is a number from 0.01 to 3 inclusive, with the proviso that the product obtained by multiplying $m$ by $n$ is at least 1. X is a halogen selected from the group consisting of chlorine and bromine, R is a monovalent substituent selected from the group consisting of hydrogen, halogen, hydrocarbon free of an aliphatic, tertiary α-carbon atom, halohydrocarbon free of an aliphatic, tertiary α-carbon atom, hydrocarbonoxy free of an aliphatic, tertiary α-carbon atom (i.e., —OR' where R' is a monovalent hydrocarbon free of an aliphatic, tertiary α-carbon atom), and halohydrocarbonoxy free of an aliphatic, tertiary α-carbon atom (i.e., —OR' where R' is a monovalent halohydrocarbon free of an aliphatic, tertiary α-carbon atom). Preferably $m$ is 0.1 thru 2 and R is hydrogen, methyl, or halomethyl, for example, —CH$_{(3-m)}$X$_m$, where X and $m$ are the same as defined above.

The overall oxidation reaction for preparing the polyphenylene ethers as disclosed and claimed in my copending application referred to above is a reaction involving the hydrogen atom of the phenolic group of one phenol molecule, a hydrogen, chlorine, bromine or iodine substituent in the para position of another phenol molecule and oxygen with the formation of water, according to the following schematic diagram:

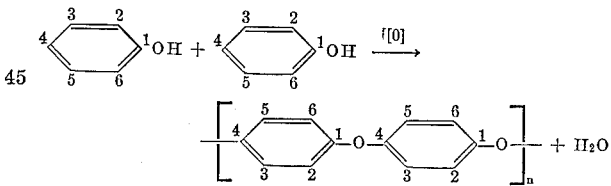

where the numbers indicate the positions of substituents and joining in the names used in this specification, and $n$ is an integer having a value of at least 10.

It is to be understood that the reaction is not a direct oxidation as illustrated but an oxidation involving participation of the copper catalyst system.

The general method of carrying out this oxidation process is to pass an oxygen containing gas through a mixture of one or more monohydric phenols (hereinafter referred to as "phenols") as starting material, at least one tertiary amine, and at least one cuprous salt.

The phenols which are oxidized by this process to prepare the polyphenylene ethers for use in making the halomethyl compounds of this invention are represented by the following formula:

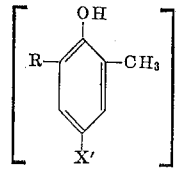

where X' is a substituent selected from the group consisting of hydrogen, chlorine, bromine and iodine, and R is as defined previously. The polyphenylene ethers so produced may be represented by the formula:

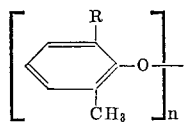

where $n$ and R are as previously defined.

In providing the catalyst comprising a cuprous salt and tertiary amine, the particular cuprous salt used has no effect on the type of product obtained. The only requirement is that the cuprous salt must be capable of existing in the cupric state and must form a complex with the tertiary amine that is soluble in the reaction medium. The necessity for being able to exist in the cupric state is based on my belief that the oxidation of the phenol is accomplished by an intermediate formation of an activated cupric amine complex that reacts with the phenol to regenerate the cuprous amine complex. As far as I can determine, it is impossible to form this activated complex by starting originally with a cupric salt in making the copper amine complex unless reducing conditions are present to form the cuprous salt in situ.

Typical examples of suitable cuprous salts are cuprous chloride, cuprous bromide, cuprous sulfate, cuprous azide, cuprous tetraamine sulfate, cuprous acetate, cuprous propionate, cuprous palmitate, cuprous benzoate, etc. Cuprous chloride, cuprous bromide and cuprous azide produce the highest molecular weight polymers. Although cupric sulfite is not known, cuprous sulfite can be used because it evidently is oxidized to cuprous sulfate. Cuprous salts such as cuprous iodide, cuprous sulfide, cuprous cyanide, cuprous thiocyanate, etc., are not suitable since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt gave no oxidation of monocyclic phenols in the presence of a tertiary amine. Because of its ready availability and low cost, I prefer to use cuprous chloride.

Examples of tertiary amines which may be used to prepare the catalyst are the aliphatic tertiary amines, such as trimethylamine, triethylamine, tripropylamine, tributylamine, trisecondary-propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamino-4-phenyl pentane, etc. When aliphatic tertiary amines are used, I prefer that at least two of the aliphatic groups be straight chain hydrocarbon groups.

In general, tertiary polyamines would behave in the same way as tertiary monoamines except of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N' - tetraalkylbutanediamines, the N,N,N',N'-tetraalkylpentanediamines, the N,N',N'',N'' - pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Those tertiary polyamines which have only two or three aliphatic or cycloaliphatic carbon atoms separating the two tertiary amino nitrogens represent a class of polyamines which is superior to the other aliphatic tertiary amines. For example, in the oxidation of monosubstituted phenols and phenol itself, such polyamines give catalysts of enhanced activity and allow the reaction to be run in a shorter time and/or at lower temperatures than could be used with the aliphatic tertiary monoamines. However, as in the case of the aliphatic tertiary monoamines, when oxidizing the mono-substituted phenols or phenol itself, the substituents on the amino nitrogen must be large, bulky groups if the high molecular weight polymers are the desired product.

Typical examples of these tertiary polyamines are, for example,

N,N,N',N'-tetramethylethylenediamine;
N-ethyl-N,N',N'-trimethylethylenediamine;
N-methyl-N,N',N'-triethylethylenediamine;
N,N,N',N'-tetramethyl-1,3-propanediamine;
N,N,N',N'-tetraethylethylenediamine;
N,N-dimethyl-N',N'-diethylethylenediamine;
1,2-bis(2-methylpiperidino)ethane;
N,N,N',N'-tetra-n-hexylethylediamine;
N,N,N',N'-tetra-n-amylethylenediamine;
1,2-bispiperidinoethane;
N,N,N',N'-tetraisobutylethylenediamine;
N,N,N',N'-tetramethyl-1,3-butanediamine;
1,2-bis(2,6-dimethylpiperidino)ethane;
N,N-didecyl-N',N'-dimethylethylenediamine;
N-methyl-N',N',N'',N''-tetraethyldiethylenetriamine;
N-decyl-N,N',N'-triethylethylenediamine;
2-($\beta$-piperidinoethyl)pyridine;
2-($\beta$-dimethylaminoethyl)-6-methylpyridine;
2-($\beta$-dimethylaminoethyl)pyridine; and
2-($\beta$-morpholinoethyl)pyridine; etc.

Examples of cyclic amines are the pyridines, such as pyridine itself, quinuclidine, the dipyridyls, the N-alkyl pyrroles, the N-alkyl pyrrolidines, the N-alkyl pipidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl) chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl tetrahydroisoquinoline, N-methyl piperidine, N-methyl pyrrolidine, N - methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

Many factors affect the stability of the complex of the tertiary amine and the cuprous salt. These factors are well known in the art and are discussed in detail in such texts as "The Chemistry of the Coordination Compounds," edited by John C. Bailar, Jr., Reinhold Publishing Corp., New York, 1956, see for example, pages 174 to 190; and "Mechanisms of Inorgtnic Reaction," Fred Basolo and Ralph G. Pearson, John Wiley & Sons, Inc., New York, 1959, see for example pages 14–24. As pointed out in the latter text on page 18, one of the major factors influencing stability is the basicity of the ligand. I have found that apparently the ability to form a stable complex as indicated by the basicity of the tertiary amines I use as ligand also is an indication of the activity of the catalyst. Those tertiary amines which are strong bases form more active catalysts than tertiary amines which are weak bases. When the latter are used, typical examples of which are 3,5-diphenylpyridine, phenanthridine, etc., I find that heating of the reaction mixture is desirable to cause the oxidation reaction to proceed rapidly.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects, I prefer not to use tertiary amines having an N-aryl substituent.

Thee preferred group of phenols for preparing the polyphenylene ether starting materials are o-creson, the 2-halo-6-methylphenols, e.g., 2-chloro-6-methylphenol, 2-bromo-6-methylphenol, etc., and 2,6-xylenol. However, other phenols having hydrocarbons, halohydrocarbon, hydrocarbonoxy, or halohydrocarbonoxy groups in one ortho position and a methyl group in the second ortho position may also be used, including those also having an aryloxy substituent in the para position. Examples of such phenols are: 2-ethyl-6-methylphenol, 2-propyl-6-methylphenol, the 2-butyl-6-methylphenols, the 2-pentyl-6-methylphenols, 2 - cyclohexyl - 6 - methylphenol, 2-phenyl-6-methylphenol, 2-tolyl-6-methylphenol, 2-benzyl-6-methylphenol, 2 - methoxy - 6 - methylphenol, 2-ethoxy-6-methylphenol, 2-phenoxy-6-methylphenol, the 2-(chloroethyl)-6-methylphenols, the 2-(chlorophenyl)-6-methylphenols, the 2-(bromopropoxy)-6-methylphenols, the 2-(iodophenoxy)-6-methylphenols, the 2-(difluoroethyl) - 6 - methylphenols, 2,6 - dimethyl - 4 - (2',6' - dimethylphenoxy)phenol, 2,6 - dimethyl - 4 - (2' - methylphenoxy)phenol, etc.

The preference of the oxidation reaction to involve the para position of these phenols is so pronounced that if it is substituted with chlorine, bromine or iodine and the two ortho positions have substituents other than hydrogen, the halogen will be removed from the para position even though the meta positions are unsubstituted. In such case, the halogen atom reacts with and inactivates one molecule of copper catalyst. Therefore, it is necessary to use 1 mole of catalyst for each atom of halogen removed. Since the reaction involving hydrogen atoms in the para position does not destroy the catalyst, only a small catalytic amount needs to be used of the order of 0.1 to 10 mole percent, based on the moles of phenol to be oxidized. Therefore, I prefer to use phenols in my oxidation process which have hydrogen in the para position.

In preparing the catalyst system, mixtures of tertiary amines and mixtures of cuprous salts may be used, but no benefit would accrue from such use over the catalyst prepared by using only a single tertiary amine and a single cuprous salt. Preferably, the cuprous salt is dissolved in the tertiary amine before the phenol reactant is added. In some cases, the dissolving of the cuprous salt may be hastened by heating the mixture, by bubbling in air or oxygen, or a combination thereof. In order to effectively use all of the copper, enough amine should be added to complex and thereby dissolve all of the added cuprous salt. Larger excesses of amine do not adversely affect the reaction, and in some cases may be desirable in order to completely dissolve all of the phenol reactant and to act as a solvent for the reaction product. Other solvents such as alcohols, ketones, hydrocarbons, chlorohydrocarbons, nitrohydrocarbons, ethers, esters, amides, mixed ether esters, sulfoxides, etc., may be present in the reaction system, providing they do not interfere or enter into the oxidation reaction. Oxygen or oxygen containing gas is bubbled into the reaction mixture causing an exothermic reaction to take place with the formation of water as a by-product. Since polymeric phenylene ethers are the desired product, it is preferable to prevent the escape of this water of reaction from the reaction vessel when carrying out the reaction by batch process, or to control the escape of water so that there is always one mole of water present for each mole of copper catalyst when carrying out the reaction by batch or continuous process. This can be done by carrying out the reaction under reflux conditions, in a closed reaction system, at superatmospheric pressure, by cooling in the presence of desiccants, or any combination thereof with controlled removal of water, if desired. Desiccants are especially useful for removing excess water where the water forms faster than it can evaporate and it forms a separate phase with the reaction medium.

The oxygen can be diluted with an inert gas such as nitrogen, helium, argon, etc., or air can be used.

Since the reaction is usually exothermic, the reaction can become overheated, resulting in the formation of undesirable products, since the resins tend to cross-link and form gels. Generally, I initiate the oxidation reaction at as low a temperature as the reaction will start, as evidenced by the reaction becoming exothermic. Usually, I control the oxidation reaction so that the maximum temperature does not exceed 100° C. and preferably does not exceed 80° C. The heat of reaction may be removed, for example, by radiation, convection, or by cooling coils which can either be immersed in, or surround, the reaction vessel.

Ordinarily, the passage of oxygen into the reaction mixture is continued until no more heat is generated, or the desired amount of oxygen is absorbed. Alternatively, I may intermittently or continuously add the same or a different phenol than the starting material during the oxidation reaction to produce a mixed polyarylene ether which has a different structure than if the mixed phenols were used as starting materials. To terminate the reaction, I destroy the catalyst system by addition of an acid, preferably a mineral acid, such as hydrochloric or sufuric acid, which reacts with the tertiary amine and cuprous salt, or I remove the product from the presence of the catalyst either by filtering off the product if it has precipitated, or by pouring the reaction mixture into a material which is a solvent for the catalyst system but a nonsolvent for the product. Alternatively, I may precipitate the copper as an insoluble compound and filter it from the solution prior to isolating the product or I may add a chelating agent which inactivates the copper. After the product is precipitated, it may be redissolved and reprecipitated any desirable number of times to remove impurities. Further details concerning the preparation of the polyphenylene ethers may be found in the copending Hay and Kwiatek applications referred to above.

In preparing the halomethyl derivatives of these polyphenylene ethers, the corresponding methyl-substituted polyphenylene ether is dissolved in a suitable solvent, preferably one which will be inert to the halogenating agent, such as a halogenated hydrocarbon, and thereafter reacted with a brominating or chlorinating agent which may be the free elemental halogen, e.g., chlorine or bromine, or a halogenating agent, for example, sulfuryl chloride, sulfuryl bromide, bromosuccinimide, etc. The reaction may be carried out at atmospheric, subatmospheric, or superatmospheric pressure, at, below or above ambient temperature. Generally, I prefer to use atmospheric pressure and the temperature from ambient up to that obtained by refluxing the reaction mixture. The halogenation reaction may be hastened by means of exposure of the solution to actinic radiation, e.g., light from an ultraviolet lamp. These are well known conditions which favor halogenation of the side chain in preference to halogenation of the aryl nucleus of the polyphenylene ethers. If a liquid or solid halogenation agent is being used, enough is added to give the desired mono-, di-, or tri-halosubstituted methyl groups on the polymer. If a gaseous halogenation agent is used, enough is passed into the reaction mixture until the amount absorbed is sufficient to give the desired degree of halogenation of the methyl groups. In general, the preponderance of the methyl groups will be monohalogenated before a second halogen is introduced and dihalogenated before a third halogen is introduced into a significant number of the methyl groups.

The halogenated polymer is recovered by pouring the solution into a large volume of a liquid which will precipitate the polymer but will dissolve the balance of the reaction mixture. A convenient solvent for this is methanol. The product may be dissolved and reprecipitated as many times as desired to obtain the desired degree of purification.

In order that those skilled in the art may better understand my invention, the following examples are given which are illustrative of the practice of my invention, and are not intended for purposes of limitation. In the examples, all parts are by weight unless otherwise stated.

*Example 1*

This example illustrates the preparation of poly(2,6-dimethyl-1,4-phenylene ether). Oxygen was continuously bubbled through a vigorously stirred solution of 900 ml. of nitrobenzene, 150 ml. of pyridine, 6 grams of cuprous chloride and 1 gram of picric acid during the entire reaction period. When all of the copper salt had dissolved, 50 grams of 2,6-dimethylphenol were added. During 15 minutes the temperature of the reaction mixture rose from 30° C. to 40° C., after which the temperature declined so that at the end of an additional 15 minutes the temperature was 36° C., and the solution was very viscous. The reaction mixture was diluted with an equivalent volume of toluene, followed by the addition of methanol which caused the polymer to precipitate. The polymer was separated by filtration, dissolved in chloroform, filtered and reprecipitated with methanol containing a small amount of hydrochloric acid to remove traces of the amine. The polymer was filtered from the solution and dried in vacuo at 130° C. The yield was 40 grams (81% of theory) of poly(2,6-dimethyl-1,4-phenylene ether) having an intrinsic viscosity of 1.09.

*Example 2*

This example illustrates the preparation of poly(2,-methyl-1,4-phenylene ether). Oxygen was continuously passed through a vigorously stirred solution of 135 ml. of s-tetrachloroethane, 1 gram of cuprous chloride, 3 grams of 2-n-amylpyridine and 4.2 grams of anhydrous magnesium sulfate during the entire reaction period. When the cuprous salt had dissolved, 7.5 grams of o-cresol were added. During a reaction time of 50 minutes, the temperature rose from 30° C. to a miximum of 47° C. The reaction was continued for an additional 50 minutes, after which time the polymer was precipitated by pouring the reaction mixture into methanol containing sufficient hydrochloric acid to react with the amine. The solid was separated by filtration and dissolved in chloroform. The solution was filtered and the polymer reprecipitated by pouring into methanol. After drying there was obtained 6.4 grams (86% of theory) of poly(2-methyl-1,4-phenylene ether) having an intrinsic viscosity of 0.21.

*Example 3*

A solution was made by dissolving 2 grams (0.017 mole) of the polymer of Example 1 in 250 ml. of s-tetrachloroethane. The solution was heated to reflux temperature, after which 2.7 grams (0.017 mole) of bromine were added. Hydrogen bromide was evolved along with some bromine from the refluxing solution. After 70 minutes the reaction mixture was colorless and the reaction allowed to cool. The polymer was precipitated by the addition of methanol to the solution. After removing the polymer from the solution by filtration, it was redissolved in chloroform, the solution filtered and the polymer reprecipitated by addition of methanol. The polymer was removed by filtration and dried at 90° C. in vacuo for 3 hours to obtain a yield of 2.5 grams of colorless solid. Two more brominations were run with larger amounts of bromine. The results of all three runs are summarized in Table I.

TABLE I

| Polymer (g.) | Br₂ Added (g.) | Yield (g.) | Analysis | | | | Br Per Unit |
|---|---|---|---|---|---|---|---|
| | | | $\eta$ | C | H | Br | |
| 2.0 | 2.7 | 2.5 | 0.81 | 51.3 | 4.0 | 30.9 | 0.73 |
| 2.0 | 5.4 | 3.6 | 0.55 | 40.8 | 2.9 | 48.9 | 1.44 |
| 2.0 | 8.1 | 4.1 | 0.38 | 38.5 | 2.6 | 54.4 | 1.70 |

All three of the above brominated polymers gave almost colorless flexible films when cast from a solution in s-tetrachloroethane at 140° C.

In a similar fashion, 36 grams of a polymer prepared in essentially the same way as in Example 1 were brominated with 100 grams of bromine to yield 59 grams of a polymer having an analysis of 35% carbon, 2.5% hydrogen and 55.4% bromine, which is equivalent to 1.89 bromine atoms per dimethylphenylene ether polymer unit.

In order to demonstrate whether the halogen atom is substituted on the methyl group or on the aryl nucleus, 1 gram of the above brominated polymer containing 48.9% bromine was dissolved in 100 ml. of purified tetrahydrofurane and 0.2 gram of lithium aluminum hydride added. The reaction mixture was refluxed for 2 hours and the solid product precipitated by pouring the reaction mixture into water containing a small amount of hydrochloric acid. The solid was dissovled in chloroform, the solution filtered and the product reprecipitated by pouring the solution into methanol. The product was an almost colorless polymer weighing 0.56 gram and having an intrinsic viscosity of 1.07 which is essentially identical with the intrinsic viscosity of the polymer of Example 1 showing that no degradation of the polymer had occurred either during the bromination reaction or the reaction with the lithium aluminum hydride. Elemental analysis showed 77.4% carbon and 4.8% hydrogen, as compared to the theoretical analysis for the polymer of Example 1 of 80% carbon and 6.7% hydrogen. The results of this test show that all but a minor amount of the bromine was present as bromomethyl groups with the minor amount being on the aryl nucleus.

*Example 4*

Gaseous chlorine was bubbled slowly for 5 minutes through a solution of 2 grams of the polymer prepared in Example 1, dissolved in 200 ml. of s-tetrachloroethane using the reflux temperature of 146° C. while the solution was irradiated by means of an ultraviolet lamp. After precipitating the polymer from the solution by addition of methanol, it was filtered and redissolved in chloroform, the solution filtered and the polymer precipitated by addition of methanol to the solution. After filtering from the solution and drying, there was obtained 1.9 grams of a colorless solid having an intrinsic viscosity of 0.31. The product analyzed as containing 54.1% carbon, 3.8% hydrogen, 33.0% chlorine, which is equivalent to 1.65 chlorine atoms per dimethylphenylene polymer unit.

In a similar way, chlorine was bubbled for 2 minutes through a chloroform solution of the polymer prepared in Example 1, after which the polymer was precipitated in methanol. The polymer obtained in this case had an elemental analysis of 64.5% carbon, 4.9% hydrogen and 19.8% chlorine, corresponding to 0.83 chlorine atoms per unit of the polymer.

Example 5

A solution of 2 grams (0.017 mole) of the polymer prepared in Example 1 dissolved in 125 ml. of carbon tetrachloride was heated to reflux temperature and 4.5 grams (0.033 mole) of sulfuryl chloride and 0.1 gram of benzoyl peroxide was added. After heating for 80 minutes at the reflux temperature, the polymer was isolated by precipitation from the solution with methanol in the manner described above. The polymer had an intrinsic viscosity of 0.53 and analyzed for 64.5% carbon, 4.3% hydrogen, 19.8% chlorine, which is equivalent to 0.83 chlorines per unit of the polymer chain.

Example 6

Using the polymer prepared in Example 2, three brominations were carried out as described in Example 3. The results of these brominations are summarized in Table II.

TABLE II

| Polymer (g.) | Br$_2$ Added (g.) | Yield (g.) | Analysis | | | | Br Per Unit |
|---|---|---|---|---|---|---|---|
| | | | $\eta$ | C | H | Br | |
| 1 | 1.5 | 1.3 | .14 | 51.8 | 3.1 | 33.8 | 0.78 |
| 1 | 3.0 | 1.6 | .095 | 44.5 | 2.5 | 45.2 | 1.21 |
| 1 | 4.5 | 2.0 | .055 | 34.2 | 1.8 | 53.8 | 1.80 |

Because these chlorine or bromine atoms in the halomethyl substituents on the polyphenylene ethers are extremely reactive, the polymers of this invention have many and varied uses. For example, they can be used directly for preparing films and molded objects having flame retardant properties because of the ready release of the halogen atoms. These polymers may be used either alone or mixed with various fillers such as wood flour, diatomaceous earth, carbon black, silica, etc. They may also be used as intermediates which are reacted with various other compounds capable of reacting with the halogen atoms to produce modified polymers of a wide variety of uses. As mentioned previously, the chlorine and bromine atoms on the methyl groups may be reacted with metallic fluorides such as antimony trifluoride, antimony pentafluoride or mixtures thereof, with antimony trifluoride, or with mercuric fluoride to produce the corresponding fluoro derivative, or by reacting with a metallic iodide to produce the corresponding iodine substituted methyl groups on the polymer. These polymers may be also reacted with alkali metal compounds according to the following equation using the monohalomethyl-substituted polyphenylene ether prepared from 2,6-xylenol for purposes of illustration. It is to be understood that from 1 to 3 of the hydrogen atoms of each of the methyl groups may be replaced wtih halogen and that in reacting the alkali metal compound, the amount used may be such that not all of the halogen atoms are replaced so that a further reaction may be carried out using an entirely different alkali metal compound to produce a mixed derivavtive, or the final compound may be left with some halogen atoms unreplaced.

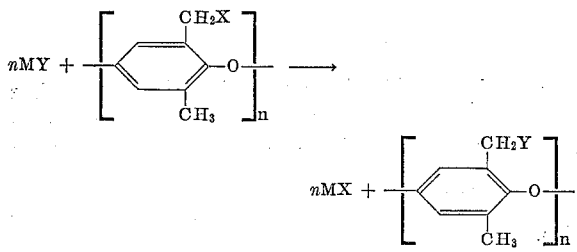

In the above equation, $n$ is at least 10, M is an alkali metal for example, lithium, sodium, potassium, rubidium, cesium, X is bromine or chlorine, and Y is any of the following radicals: —CN, —SH, —SR, —SeR, —TeR, —OR, —R, —F, —I, >SO$_3$, —HSO$_3$, —CH$_2$(COR)$_2$, —CH(COOR)$_2$, —ONO, —NO$_2$, —SCN, —OH, —H, where each R is hydrocarbon.

As will be readily apparent to those skilled in the art, some of these compounds produced may be further reacted to produce still further interesting derivatives. For example, after the halogen is replaced with a cyano group, it may be hydrolyzed with water to produce an amide or further hydrolyzed to a carboxyl group or hydrolyzed with an alcohol to produce an ester group. The mercapto group may be converted to a sulfoxide, sulfone or sulfonic acid group.

The halomethyl groups of my new polyphenylene ethers may also be reacted with amines, phosphines, phosphites, arsines, stibines, thioethers, selenoethers, telluroethers, etc., to give salts. For example, the reaction with a tertiary amine gives a quaternary ammonium salt as a substituent on the methyl group, and the reaction with a thioether gives a sulfonium salt. Thiourea gives a thiouronium salt which by basic hydrolysis can be converted to a thiol.

The bromine or chlorine atom on the methyl group may also be reacted with aromatic hydrocarbon in a Friedel-Crafts reaction which involves replacing the halo group on the methyl group with an aryl group.

The following examples illustrate some of the derivatives which may be prepared by using my halomethyl-substituted polyphenylene ethers.

Example 7

In a manner similar to that described in Example 3, a bromomethyl-substituted polyphenylene ether was made containing 1.07 bromine atoms per repeating unit and having an intrinsic viscosity of 0.74. It had an elemental analysis of 47.8% carbon, 3.6% hydrogen, and 42.3% bromine. A solution of 3 grams of this polymer in 250 ml. of benzene was maintained at reflux temperature while adding 0.1 gram of anhydrous aluminum chloride. Hydrogen bromide was evolved and the solution became dark in color. The reaction was continued at reflux temperature for 10 minutes and then poured into a large volume of methanol which precipitated the product so that it could be filtered from the solution. The polymer was redissolved in chloroform, the solution filtered, and the polymer reprecipitated in methanol yielding 1.8 grams of a light pink polymer having an elemental analysis of 67.1% carbon, 4.9% hydrogen and 19.5% bromine. A longer reaction period would have caused more of the bromine atoms to be replaced with phenyl groups by reaction with the benzene. The product obtained in this reaction was a benzyl-substituted polyphenylene ether also containing a minor proportion of bromomethyl substituents.

Example 8

A solution of 50 ml. of diphenyl ether containing 0.5 gram of the bromomethyl substituted polyphenylene ether prepared in Example 3 containing 55.4% bromine was heated to 150° C. and 0.1 gram of anhydrous aluminum chloride was added. Hydrogen bromide was evolved and the solution became dark. After 5 minutes of reaction at this temperature, the polymer was precipitated by pouring the reaction mixture into a large volume of methanol. After purification, there was obtained 0.56 gram of polymer having an intrinsic viscosity of 0.18. This polymer was a phenoxybenzyl-substituted polyphenylene ether. Similar results were obtained when zinc dust was substituted for the anhydrous aluminum chloride.

Those compounds above having acidic or basic groups have the ability to absorb cations and anions respectively and are therefore ideally suited for a preparation of ion exchange resins and for the treating of water to remove ions therefrom. The cation exchange resins and their method of preparation are specifically disclosed and claimed in my copending application, Serial No. 155,828, and anion exchange resins and their method of preparation are specifically disclosed and claimed in my copending application, Serial No. 155,829, both of which are filed simultaneously herewith and assigned to the same assignee as the present invention.

As will be apparent from the above disclosure, the halogenated polyphenylene ethers of the present invention may contain either chloromethyl groups or bromomethyl groups or a mixture thereof. Likewise, in reacting the halogenating agent with the polyphenylene ether I may use an amount of halogenating agent so that not all of the methyl groups are halogenated. For example, I may add only enough halogenating agent to introduce halogen atoms on as few as one-tenth of one percent of a number of available methyl groups in the polyphenylene ether (i.e., $m$ in the formula for the compositions of this invention is at least 0.001). Preferably, there is at least one halogen atom on one out of every 100 methyl groups (i.e., $m$ is at least 0.01). As pointed out previously, a maximum of 3 halogen atoms can be introduced on each methyl group (i.e., $m$ is at a maximum of 3) in the formula for the compositions of this invention. Generally, the most useful products are those in which the number of halogens per methyl group is in the range of 0.1–2 inclusive (i.e., there is at least one halogen atom on one out of every 10 methyl groups up to 2 halogen atoms on every methyl group). It is to be recognized that the number of halogen atoms per methyl group is an average value determined from the percent halogen in the polymer which is readily converted to the number of atoms of halogen per methyl group in each polymer unit.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of preparing halomethyl-substituted polyphenylene ethers which comprises reacting a halogenating agent selected from the group consisting of chlorinating and brominating agents under side chain halogenating conditions with a polyphenylene ether having the structural formula

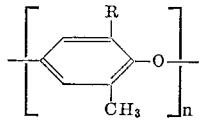

where $n$ is a positive integer and is at least 10 and R is a monovalent constituent selected from the group consisting of hydrogen, halogen, hydrocarbon free of an aliphatic, tertiary α-carbon atom, halohydrocarbon free of an aliphatic, tertiary α-carbon atom and —OR′ where R′ is a monovalent substituent selected from the group consisting of hydrocarbon free of an aliphatic, tertiary α-carbon atom and halohydrocarbon free of an aliphatic, tertiary α-carbon atom.

2. The process of claim 1 wherein R is hydrogen.
3. The process of claim 1 wherein R is methyl.
4. The process of producing chloromethyl-substituted polyphenylene ethers which comprises reacting a chlorinating agent under side chain chlorinating conditions with a polyphenylene ether having the structural formula

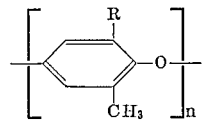

where $n$ is a positive integer and is at least 10 and R is a monovalent constituent selected from the group consisting of hydrogen, halogen, hydrocarbon free of an aliphatic, tertiary α-carbon atom, halohydrocarbon free of an aliphatic, tertiary α-carbon atom and —OR′ where R′ is a monovalent substituent selected from the group consisting of hydrocarbon free of an aliphatic, tertiary α-carbon atom and halohydrocarbon free of an aliphatic, tertiary α-carbon atom.

5. The process of claim 4 wherein chlorine is the chlorinating agent.
6. The process of producing bromomethyl-substituted polyphenylene ethers which comprises reacting a brominating agent under side chain brominating conditions with a polyphenylene ether having the structural formula

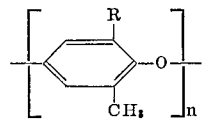

where $n$ is a positive integer and is at least 10 and R is a monovalent constituent selected from the group consisting of hydrogen, halogen, hydrocarbon free of an aliphatic, tertiary α-carbon atom, halohydrocarbon free of an aliphatic, tertiary α-carbon atom and —OR′ where R′ is a monovalent substituent selected from the group consisting of hydrocarbon free of an aliphatic, tertiary α-carbon atom and halohydrocarbon free of an aliphatic, tertiary α-carbon atom.

7. The process of claim 6 wherein bromine is the brominating agent.
8. Polyphenylene ethers having the structural formula

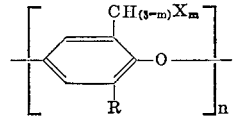

where $n$ is a positive integer and is at least 10, $m$ is a number from 0.01 to 3 inclusive, with the proviso that the product obtained by multiplying $m$ by $n$ is at least 1, X is a halogen selected from the group consisting of chlorine and bromine and R is a monovalent substituent selected from the group consisting of hydrogen, halogen, hydrocarbon free of an aliphatic, tertiary α-carbon atom, halohydrocarbon free of an aliphatic, tertiary α-carbon atom and —OR′ where R′ is a monovalent substituent selected from the group consisting of hydrocarbon free of an aliphatic, tertiary α-carbon atom and halohydrocarbon free of an aliphatic, tertiary α-carbon atom.

9. Polyphenylene ethers of claim 8 wherein X is chlorine and R is hydrogen.
10. Polyphenylene ethers of claim 8 wherein X is bromine and R is hydrogen.
11. Polyphenylene ethers having the structural formula

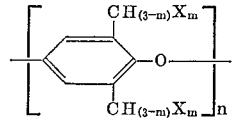

where $n$ is a positive integer and is at least 10, $m$ is a number from 0.01 to 3 inclusive, with the proviso that the product obtained by multiplying $m$ by $n$ is at least 1, and X is a halogen selected from the group consisting of chlorine and bromine.

12. Polyphenylene ethers of claim 11 wherein X is chlorine.

13. Polyphenylene ethers of claim 11 wherein X is bromine.

14. Polyphenylene ethers of claim 11 wherein X is chlorine and $m$ is one.

15. Polyphenylene ethers of claim 11 wherein X is bromine and $m$ is one.

References Cited by the Examiner

UNITED STATES PATENTS

| 2,632,001 | 3/1953 | McMaster et al. | 260—2.1 |
| 3,134,753 | 5/1964 | Kwiatek | 260—47 |

FOREIGN PATENTS

| 1,234,336 | 5/1960 | France. |

OTHER REFERENCES

Royals: Advanced Organic Chemistry, Prentice-Hall, Inc. (1954), pages 454–455, QD251 R68.

ASTIA, AD 266,452, pages 6, 7 and 18–20, Nov. 22, 1961.

Haynes et al.: Chemical Society Journal, pages 2823–1 (1956).

WILLIAM H. SHORT, *Primary Examiner.*

LOUISE P. QUAST, *Examiner.*

J. T. BROWN, J. C. MARTIN, *Assistant Examiners.*